(12) United States Patent
Palmer (10) Patent No.: US 10,726,643 B2
(45) Date of Patent: Jul. 28, 2020

(54) METHOD FOR PREDICTING CORROSION POTENTIAL, MONITORING CONTAMINANT LOAD AND OPTIMIZING CORROSION MAINTENANCE

(71) Applicant: Sikorsky Aircraft Corporation, Stratford, CT (US)

(72) Inventor: Carl Palmer, Pittsford, NY (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 177 days.

(21) Appl. No.: 15/571,425

(22) PCT Filed: Mar. 30, 2016

(86) PCT No.: PCT/US2016/024973
§ 371 (c)(1),
(2) Date: Nov. 2, 2017

(87) PCT Pub. No.: WO2016/200467
PCT Pub. Date: Dec. 15, 2016

(65) Prior Publication Data
US 2019/0156598 A1    May 23, 2019

Related U.S. Application Data

(60) Provisional application No. 62/174,272, filed on Jun. 11, 2015.

(51) Int. Cl.
*G07C 5/08* (2006.01)
*B64F 5/60* (2017.01)
(Continued)

(52) U.S. Cl.
CPC .............. *G07C 5/0808* (2013.01); *B64F 5/60* (2017.01); *G01N 17/006* (2013.01);
(Continued)

(58) Field of Classification Search
CPC ....... G07C 5/0808; G07C 5/006; B64F 55/60; G01N 17/006; B64D 2045/0085
(Continued)

(56) References Cited

U.S. PATENT DOCUMENTS 6,623,616 B1    9/2003   Malver et al.
7,231,318 B2    6/2007   Kihira et al.
(Continued)

FOREIGN PATENT DOCUMENTS

| KR | 101402306 | 6/2014 |
| WO | 2001080043 A2 | 10/2001 |
| WO | 2014018288 A1 | 1/2014 |

OTHER PUBLICATIONS

Extended European Search Report; EP 16807949 dated Dec. 12, 2018; 7 pages.
(Continued)

*Primary Examiner* — Marthe Y Marc-Coleman
(74) *Attorney, Agent, or Firm* — Cantor Colburn LLP (57) ABSTRACT

A corrosion management method is provided and includes storing an asset fleet at a location, generating a corrosion rate stressor by reference to models for any component of an asset of the asset fleet corresponding to the location and storage practice of the asset, predicting an accumulated corrosion stressor severity from the generated corrosion rate stressor, measuring an actual corrosion rate stressor at the location and revising the models in accordance with a difference between the predicted accumulated corrosion stressor severity and the measured actual corrosion rate stressor.

13 Claims, 8 Drawing Sheets

(51) Int. Cl.
*G01N 17/00* (2006.01)
*G07C 5/00* (2006.01)
*B64D 45/00* (2006.01)

(52) U.S. Cl.
CPC ...... *B64D 2045/0085* (2013.01); *G01N 17/00* (2013.01); *G07C 5/006* (2013.01)

(58) Field of Classification Search
USPC ........................................................ 701/31.4
See application file for complete search history.

(56) References Cited

U.S. PATENT DOCUMENTS

| | | |
|---|---|---|
| 7,526,944 B2 | 5/2009 | Sabata et al. |
| 2003/0191564 A1 | 10/2003 | Haugse et al. |
| 2006/0004499 A1 | 1/2006 | Trego et al. |
| 2006/0162431 A1* | 7/2006 | Harris .................. G01N 17/006 73/86 |
| 2012/0179326 A1 | 7/2012 | Ghelam |
| 2015/0268152 A1* | 9/2015 | Friedersdorf .......... G01N 17/04 73/25.01 |

OTHER PUBLICATIONS

International Search Report and Written Opinion; International Application No. PCT/US2016/024973; International filing Date: Mar. 3, 2016; dated Sep. 16, 2016; 12 Pages.

* cited by examiner

METHOD FOR PREDICTING CORROSION POTENTIAL, MONITORING CONTAMINANT LOAD AND OPTIMIZING CORROSION MAINTENANCE

CROSS REFERENCE TO RELATED APPLICATIONS

This application is a National Stage application of PCT/US2016/024973, filed Mar. 30, 2016, which claims the benefit of U.S. Provisional Application No. 62/174,272, filed Jun. 11, 2015, both of which are incorporated by reference in their entirety herein.

FEDERAL RESEARCH STATEMENT

This invention was made with government support under contract no. ONR N00014-12-C0-0394 awarded by the Navy. The government has certain rights to this invention.

BACKGROUND OF THE INVENTION

The subject matter disclosed herein relates to methods and systems for predicting corrosion potential, monitoring corrosive contaminant load and optimizing corrosion maintenance.

A tremendous amount of inspection and maintenance is required to combat corrosion on aircraft (or other vehicles or assets). Currently, most asset owners perform regularly scheduled maintenance actions but, unfortunately, the schedule is rarely optimized. This lack of optimization leads to costs in terms of unnecessary asset inspection/maintenance/downtime or missing corrosion that has occurred.

Asset fleet owners currently improve their maintenance performance by altering their maintenance schedules based on establishing general environmental corrosivity zones. These corrosivity zones are defined in accordance with locations of assets and their proximity to certain environmental conditions. For example, assets located in the desert (dry, low salt) will be said to exist in a low corrosivity zone and will generally require less corrosion upkeep than assets in humid, high corrosivity zones near the ocean (such as on the Florida coast). While this method is helpful on average, it does not account for the specifics of locations (e.g. is the asset sheltered?) or operational profiles (where and how is the asset operated) of each individual asset, nor does it account for microclimates within the aircraft that could be causing more localized corrosion.

Indeed, a typical method that is in use for estimating the potential for corrosion based on the severity of the environment around an asset uses average values of environmental corrosion stressors over a period of time. Most assessments of general environmental corrosivity have the form:

$$\text{Corrosivity}^* = f(T, RH, Cl, Su),$$

where * can also be 'Environmental Severity' or some 'index' of the environmental severity and where corrosivity is reported in the units of g/m²/yr (or similar), T=average temperature, RH=average relative humidity, Cl=average chloride deposition rate and Su=average Sulfur, SO2 or pollutant deposition rate. In many assessment methods, the T and RH components may be combined into a "time of wetness" (TOW) term, which is often defined as a percent of time that RH>80% when T>0° C.

Once a corrosivity of a location is determined, asset fleet owners can calculate a prediction for average corrosion rate (CR) of the materials (e.g., aluminum) in their assets over the period of time selected. Unfortunately, the methodology of using average values of environmental stressors over the time period leads to a much lower than desirable correlation with actual corrosion that has occurred, thus making the assessment less useful.

The reason that the correlation of the typical methods is low is that a large percent of the overall long-term corrosion is driven by short term instantaneous corrosion rates which can be very high, based on the instantaneous (not average) levels for T, RH. Also, the physical relationship of corrosion rate as a function of humidity/moisture should be more of an 'Arrhenius' form, rather than a single 'wet/dry' assessment at 80% RH. That is, a humidity value of 95% will drive corrosion much more than 83%. Likewise, in some instances, RH values below 80% will still drive corrosion when there is a substantial amount of hygroscopic contaminants on the surface (that may tend to attract or retain the moisture). Moreover, since the typical CR relationships are typically valid only for external environments, one cannot easily estimate a CR for an internal space based on those algorithms. Finally, it is noted that for typical corrosion rate estimation methods, contaminant loads are based on an average loading rate and not an actual contaminant load level (e.g., Cl buildup) on a surface. Thus, with the typical methods, the effect of surface cleanings cannot be accounted for.

BRIEF DESCRIPTION

According to one aspect, a corrosion management method is provided and includes storing an asset fleet at a location, generating a corrosion rate stressor by reference to models for any component of an asset of the asset fleet corresponding to the location and storage practice of the asset, predicting an accumulated corrosion stressor severity from the generated corrosion rate stressor, measuring an actual corrosion rate stressor at the location and revising the models in accordance with a difference between the predicted accumulated corrosion stressor severity and the measured actual corrosion rate stressor.

In accordance with additional or alternative embodiments, the generating of the corrosion rate stressor includes measuring an instant relative humidity at the location over a period of time, measuring an instant temperature at the location over the period of time and calculating from the measured instant relative humidity and the measured instant temperature an effective relative humidity at the location over the period of time.

In accordance with additional or alternative embodiments, the generating of the corrosion rate stressor further includes associating the effective relative humidity with a contaminant load at the location over the period of time.

In accordance with additional or alternative embodiments, the measuring of the actual corrosion rate includes installation of a corrosion sensor.

In accordance with additional or alternative embodiments, the predicting includes integrating the corrosion rate stressor over time.

In accordance with additional or alternative embodiments, the method further includes testing maintenance and operations options.

In accordance with additional or alternative embodiments, the method further includes conducting a maintenance operation on the asset in accordance with a result of the measuring of the actual corrosion rate.

According to yet another aspect, a system for managing corrosion of an asset fleet is provided and includes a plurality of assets disposed at a location, one or more corrosion sensors installed on each of the assets and a controller coupled to the one or more corrosion sensors of each of the assets. The controller includes a processing unit and a non-transitory computer readable medium having instructions stored thereon, which, when executed, cause the processing unit to generate a corrosion rate stressor by reference to models for the location of any component of an asset of the asset fleet corresponding to the location and a storage practice of the asset, predict an accumulated corrosion stressor severity from the generated corrosion rate stressor, measure an actual corrosion rate stressor at the location and revise the models in accordance with a difference between the predicted accumulated corrosion stressor severity and the measured actual corrosion rate stressor.

In accordance with additional or alternative embodiments, the generating of the corrosion rate stressor includes measuring an instant relative humidity at the location over a period of time, measuring an instant temperature at the location over the period of time and calculating from the measured instant relative humidity and the measured instant temperature an effective relative humidity at the location over the period of time.

In accordance with additional or alternative embodiments, the generating of the corrosion rate stressor further includes associating the effective relative humidity with a contaminant load at the location over the period of time.

In accordance with additional or alternative embodiments, the measuring of the actual corrosion rate includes installation of a corrosion sensor.

In accordance with additional or alternative embodiments, the predicting includes integrating the corrosion rate stressor over time.

In accordance with additional or alternative embodiments, the method further includes testing maintenance and operations options.

In accordance with additional or alternative embodiments, the method further includes conducting a maintenance operation on the asset in accordance with a result of the measuring of the actual corrosion rate.

These and other advantages and features will become more apparent from the following description taken in conjunction with the drawings.

BRIEF DESCRIPTION OF THE DRAWINGS

The subject matter, which is regarded as the embodiments, is particularly pointed out and distinctly claimed in the claims at the conclusion of the specification. The foregoing and other features, and advantages are apparent from the following detailed description taken in conjunction with the accompanying drawings in which:

The detailed description explains embodiments, together with advantages and features, by way of example with reference to the drawings.

DETAILED DESCRIPTION

As will be described below, methods and systems are provided for predicting environmental severity or corrosivity levels based on local environments, micro environments and events. Contaminant loads on a part are assessed and optimized wash/maintenance schedules based on tracking contaminant loads, predicting future weather events and contaminant load levels are enabled. The methods and systems rely upon the assumption that a relationship for corrosivity should be calculated on an instantaneous basis and based on instantaneous input values, have an Arrhenius type shape to the relationship with respect to moisture or humidity and be based on actual current contaminant loads on a part. The methods and systems also rely on the above-noted equation for calculating an instantaneous value of corrosivity:

$$\text{Corrosivity}^* = f(T, RH, C\_L),$$

where * can also be 'Environmental Severity' or some 'index' of the environmental severity and where corrosivity is reported in the units of g/m2/yr (or similar), T=instantaneous temperature, RH=instantaneous relative humidity, C_L=contaminant load on the part. C_L would be a function of chloride, sulfur and pollution deposition rates (integrated over time) and how recently the part was cleaned. An overall corrosion severity (or environmental severity index) is calculated by integrating the instant corrosivity as a function of time.

Figure 2:
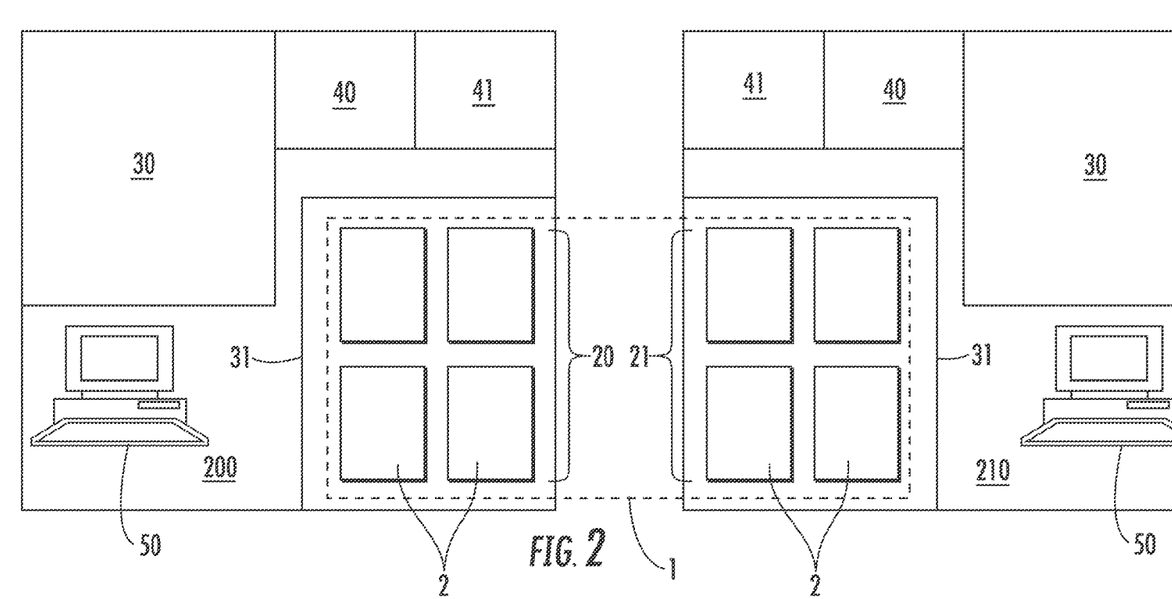
FIG. 2 is a schematic view of an asset fleet in accordance with embodiments.
Figure 3:
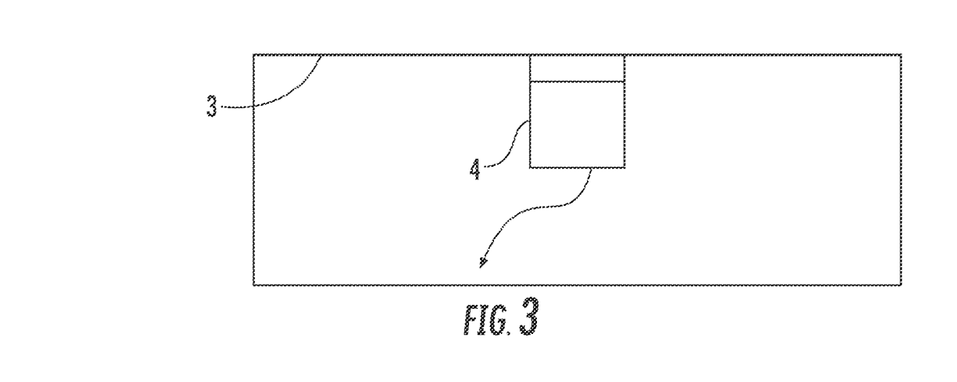
FIG. 3 is a side view of a corrosion sensor in accordance with embodiments.

With reference to FIGS. 2 and 3, a fleet 1 is provided and includes a plurality of assets 2. The assets 2 may be vehicles, aircraft or other similar equipment and have generally interior and exterior surfaces 3 that are subject to corrosion from exposure to surrounding environments. In accordance with embodiments, these interior and exterior surfaces 3 may be formed of metallic materials or metallic alloys. For purposes of clarity and brevity, it will be understood that the assets 2 may be divided into a first group 20 and a second group 21. The first group 20 is disposed at a first location 200 that is characterized as being a low corrosion environment, such as a desert where relatively low concentrations of salt and humidity are present in the air surrounding the local assets 2. Conversely, the second group 21 is disposed at a second location 210 that is characterized as being a high corrosion environment, such as a beach head where relatively high concentrations of salt are present in the air surrounding the local assets 2.

As shown in FIG. 3, one or more corrosion sensor(s) 4 are installed on a material of the interior and exterior surfaces 3 of each of the assets 2. The corrosion sensor 4 is disposed and configured to sense an amount of corrosive materials on, and environmental conditions (temperature and humidity) near, the local surface 3 whereby a total amount of corrosive materials on the local surface 3 can be determined. From this determination, a corrosive environmental severity for the surface 3 can be calculated by taking into account micro-environmental events and cleaning/maintenance events as will be described below.

Figure 1:
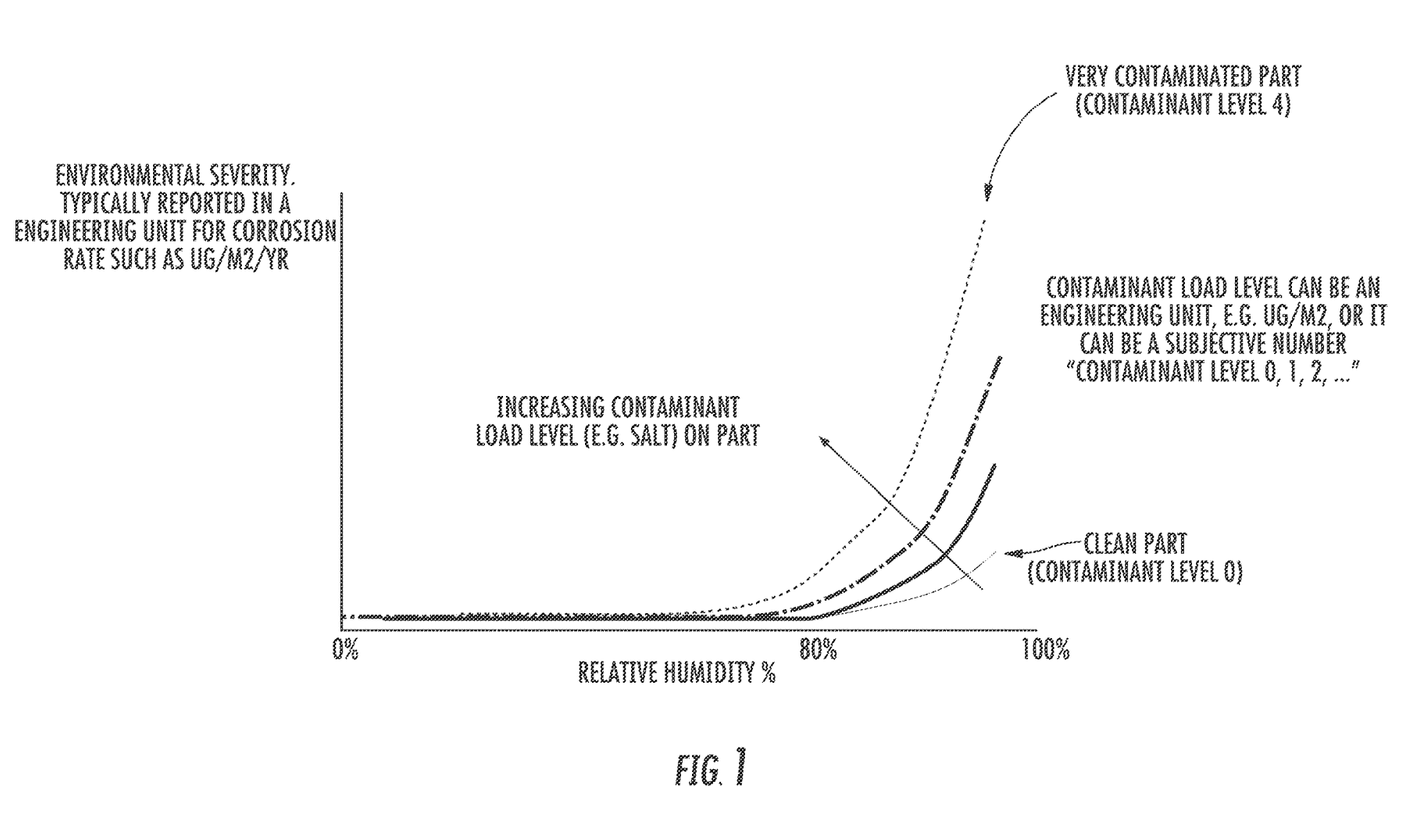
FIG. 1 is a graphical illustration of corrosion rate versus relative humidity for different corrosive contaminant loading levels (such as salt or sulfur compounds).

The corrosion sensor 4 may be provided as a linear polarization resistance (LPR) sensor that sits on the material of the surface 3 and faces the surrounding environment. The corrosion sensor 4 thus sees a same contaminant load and environmental conditions as the surrounding portions of the material and tracks contaminant load over time by measuring an actual corrosion rate of the material or some closely related value. Data generated by the corrosion sensor 4 may not directly provide for a reading of a contaminant load level (e.g. mg/m2), so a 'load level' parameter for an instant corrosivity rate relationship can be binned into subjective contaminant 'levels'—0 through X. As an example, FIG. 1 shows levels 0 through 3. Using a Bayesian Belief Network (BBN) that takes measurements for temperature, relative humidity (RH) plus an input for the contaminant load level to estimate probabilities of corrosiveness, it is to be understood that every possible corrosivity value may be in a 'bin' where the probability of each bin is calculated given the inputs. An estimate for the actual overall corrosivity is then calculated by multiplying the probability of corrosion being in each 'bin' times the mean value of the corrosivity value range represented by that bin, and summing this weighted value across all the bins.

Both the first location 200 and the second location 210 include indoor facilities 30 and outdoor facilities 31 for storage of the assets 2 as well as cleaning and maintenance systems 40, 41 for cleaning corrosive loads off the exterior and interior surfaces 3 of the assets 2 and for general upkeep of the assets 2. The first and second locations 200 and 210 also include controllers 50 that may be interconnected with one another and with additional controller components. The controllers 50 may be provided as a BBN and may each include a processing unit and a non-transitory computer readable medium having executable instructions stored thereon. When executed, the executable instructions cause the processing unit to predict a corrosivity rate (environmental severity) for the material of the exterior and interior surfaces 3 of each of the assets 2 at the first and second locations 200 and 210 even as the corrosion rate changes over time, measure an actual corrosion rate of the material at the first and second locations 200 and 210, establish an expected difference between the predicted corrosion rate and the actual corrosion rate specific to that location in accordance with the micro-environmental events and cleaning/maintenance events (that effect the contaminant load level) and determine whether an actual difference between the predicted corrosion rate and the actual corrosion rate exceeds the expected difference.

With reference to FIGS. 4-8, first, second and third modeling processes that can be executed by the systems described above will now be described.

Figure 4:
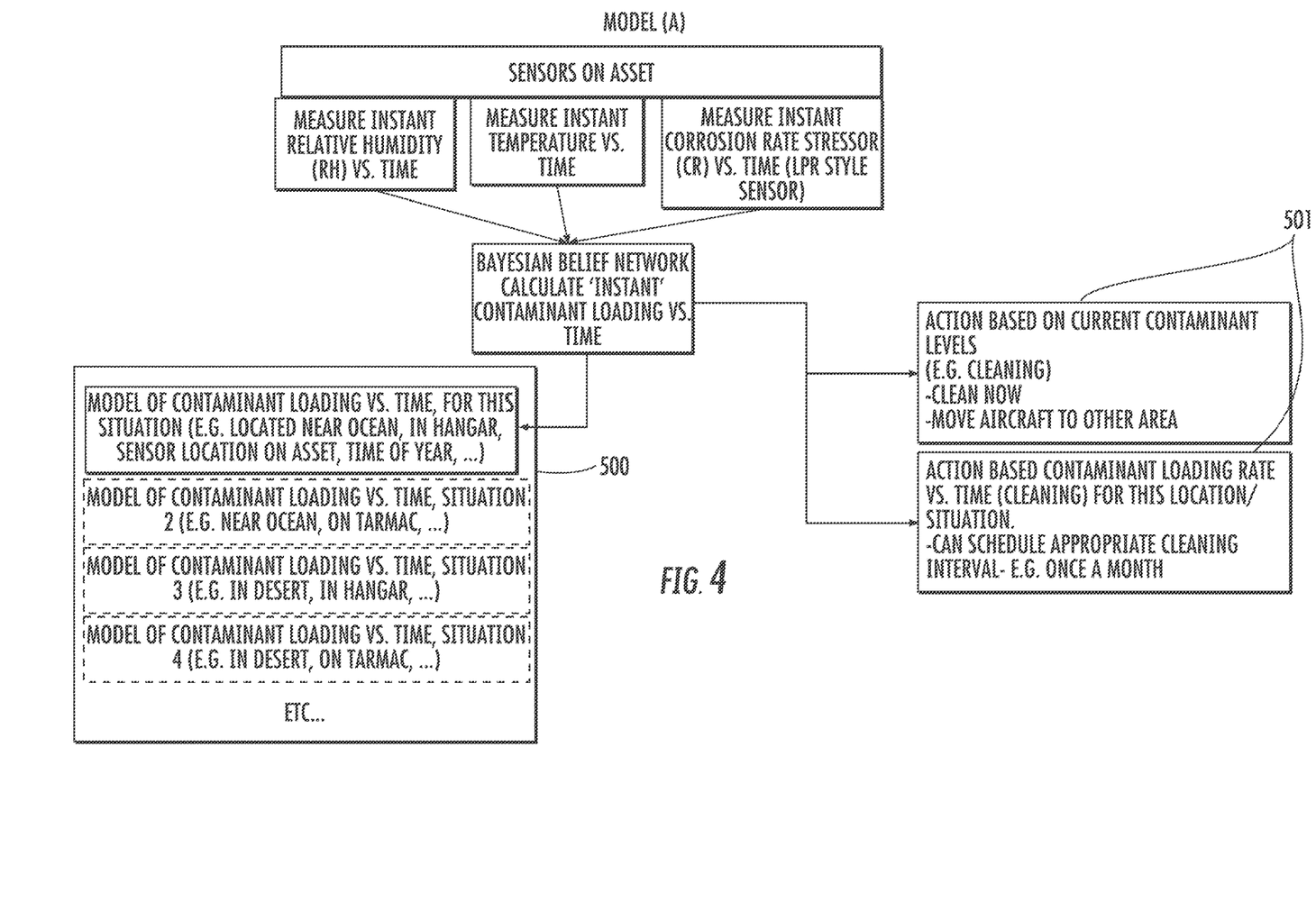
FIG. 4 is a flow diagram illustrating a first modeling process in accordance with embodiments.
Figure 5:
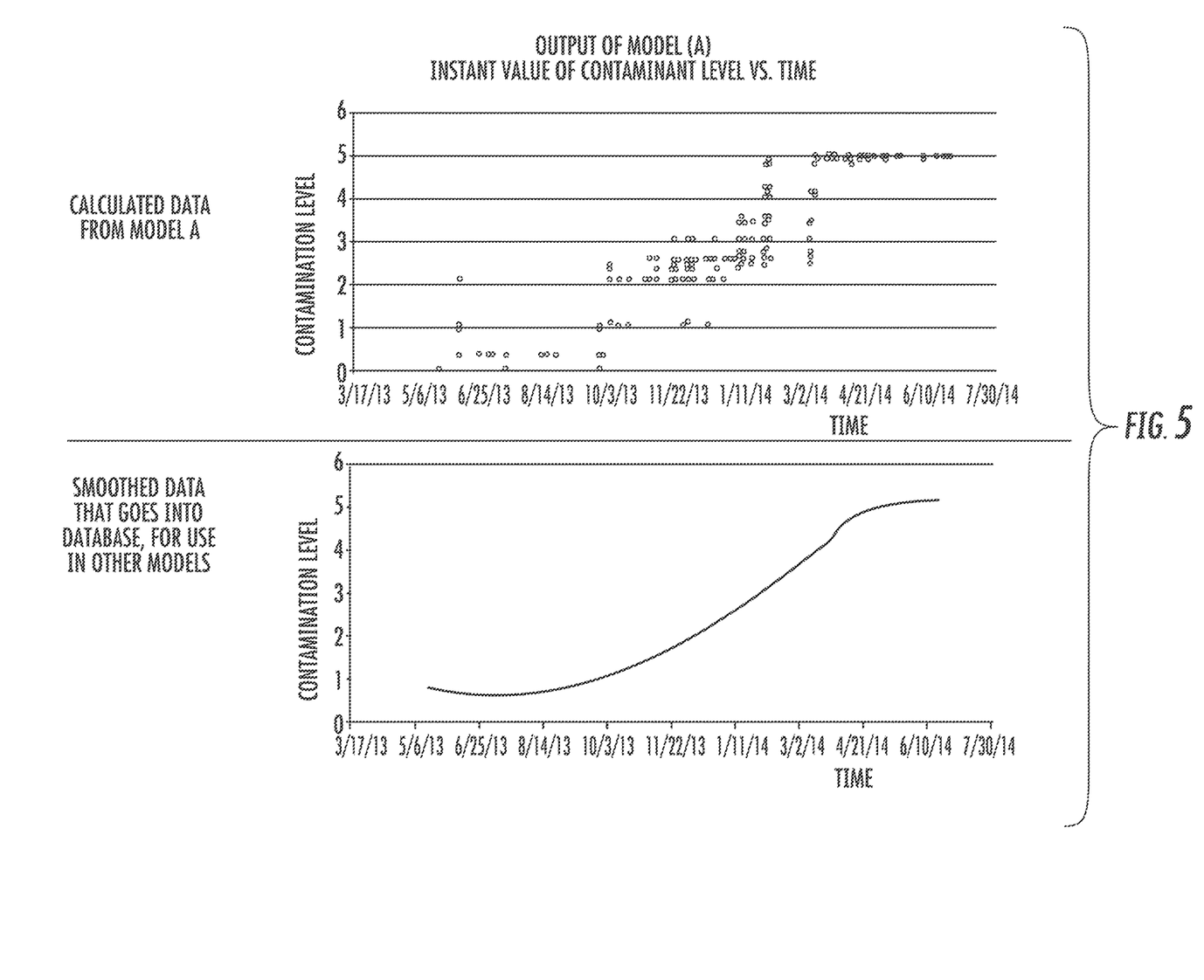
FIG. 5 is a graphical illustration of an output of the first modeling process of FIG. 4.

As shown in FIGS. 4 and 5, the first model (i.e., Model A) is used to determine actual current contaminant loading and contaminant loading vs. time readings at the corrosion sensor 4 locations based on past through present data. The results of this model A can feed maintenance actions or populate a database that gets used by other models. The corrosion sensors 4 installed on the assets 2 each measure instant relative humidity (RH) vs. time, instant temperature vs. time and an instant corrosion rate stressor (CR) vs. time. As used herein, the CR is a corrosion rate stressor as opposed to an actual corrosion rate. This is because an actual corrosion rate is not present in this analysis and because the calculation is directed toward generating a value related to a severity of the environment around the corrosion sensors 4 and should correlate with a corrosion rate on parts (although it is to be understood that there would be a different correlation for each different type and material of part). In any case, the CR is calculated at the corrosion sensor 4 locations and it is assumed that the areas near these locations experience roughly the same environmental and contamination conditions.

An output of the corrosion sensors 4 can be input to a Bayesian Belief Network (BBN) to generate rough or smoothed out databases 500 of contaminant loading models vs. time for use in other calculations and to initiate certain actions 501.

Figure 6:
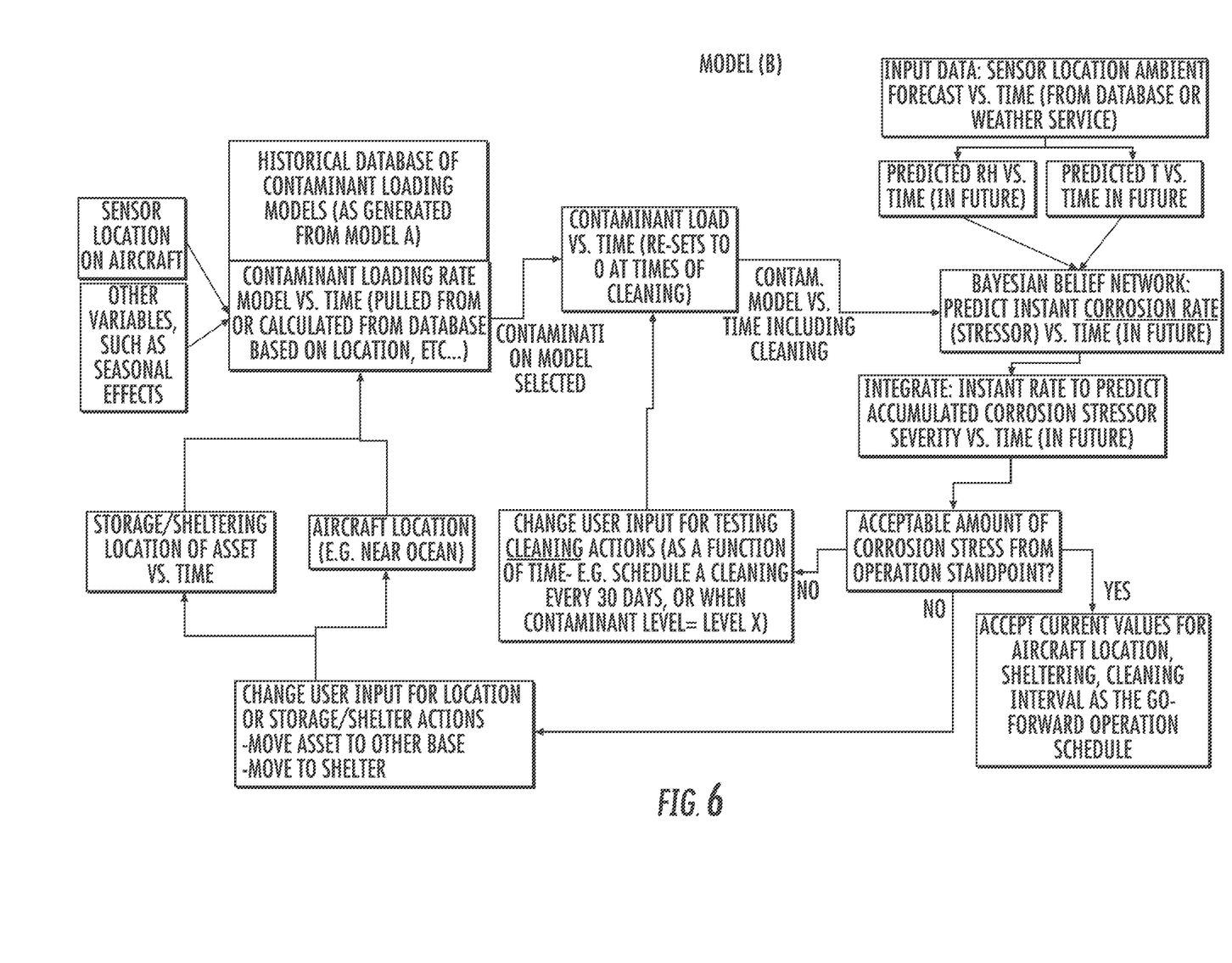
FIG. 6 is a flow diagram illustrating a second modeling process in accordance with further embodiments.
Figure 7:
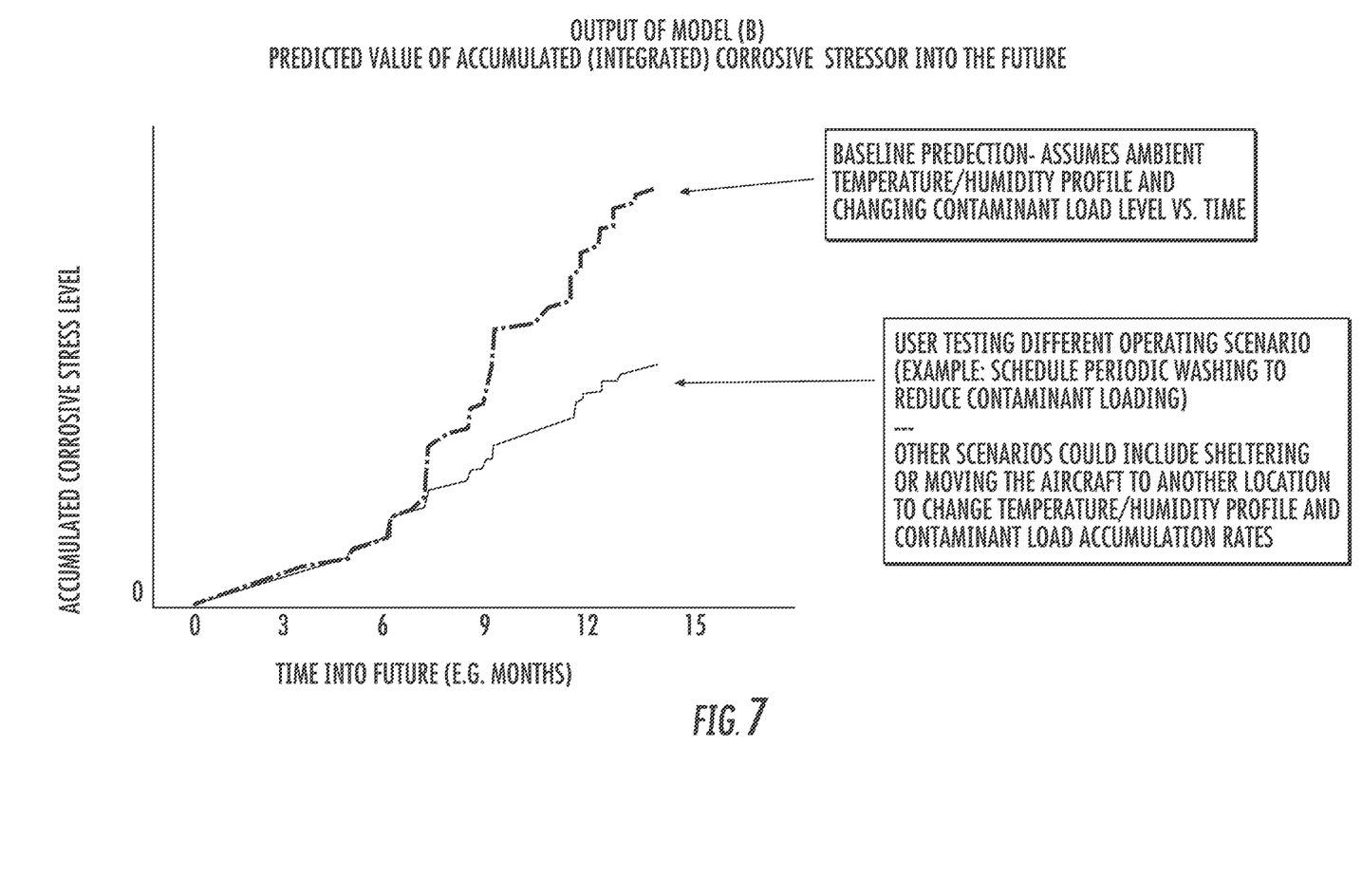
FIG. 7 is a graphical illustration of an output of the second modeling process of FIG. 6.

As shown in FIGS. 6 and 7, the second model (i.e., Model B) is used to predict corrosion stressor levels in the future in order to optimize maintenance and operation actions related to corrosion for specific aircraft or locations on the aircraft. The second model takes as an input the data from Model A along with additional data, such as predicted weather conditions for the corrosion sensor 4 locations, and initially generates via the BBN a predicted corrosion rate stressor vs. time. The second model then integrates this predicted corrosion rate to generate a prediction of an accumulated corrosion stressor severity vs. time and determines whether the result of the prediction suggests that an acceptable amount of corrosion stress will be applied to the assets 2 (see FIG. 7). In an event that a result of the determination is affirmative, the second model accepts current planned inputs for asset location, sheltering, cleaning intervals, etc.

In an event that the result of the determination is negative, the second model then either changes user inputs for testing cleaning actions as a function of time or changes user inputs for location, storage or shelter of the assets. In either case, the databases 500 of the first model are updated and the second model is rerun.

Figure 8:
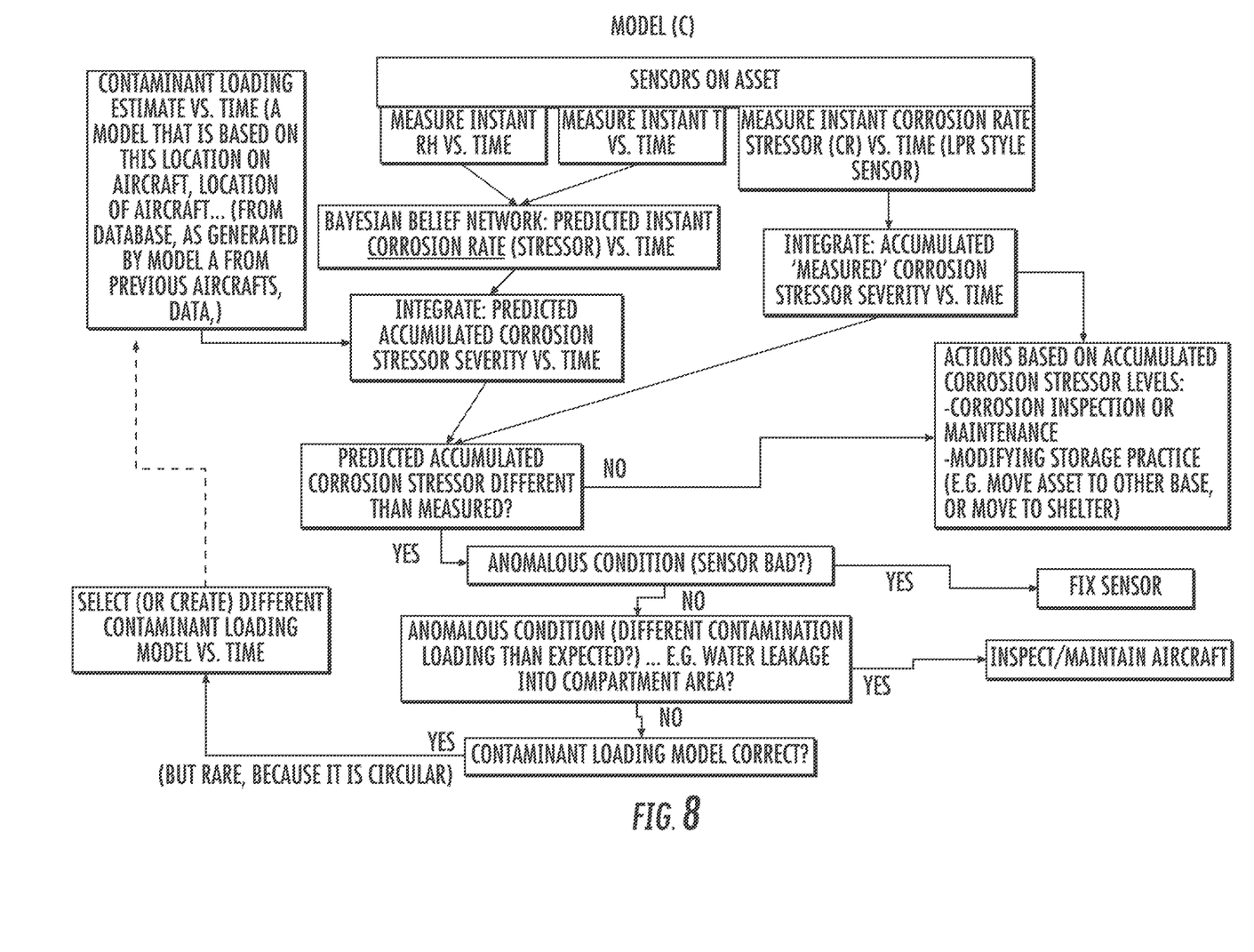
FIG. 8 is a flow diagram illustrating a third modeling process in accordance with further embodiments.

As shown in FIG. 8, the third model (i.e., Model C) relates to calculations made on past data and up through current data. The third model is thus used to assess whether locations of assets 2 or whether storage of assets 2 need to be changed, to determine if the corrosion sensors 4 are operating correctly and to determine if contaminant loading is different than expected. For example, if the accumulated corrosion stressor severity vs. time prediction is found to be different from a measurement of an actual accumulated corrosion stressor severity, the corresponding corrosion sensors 4 may be operating abnormally and need to be fixed or recalibrated. Otherwise, there may be an anomalous condition in effect that was previously unknown. In either case, the first and second models may need to be updated to reflect the potential corrosion sensor 4 issue or the anomalous condition issue.

Figure 9:
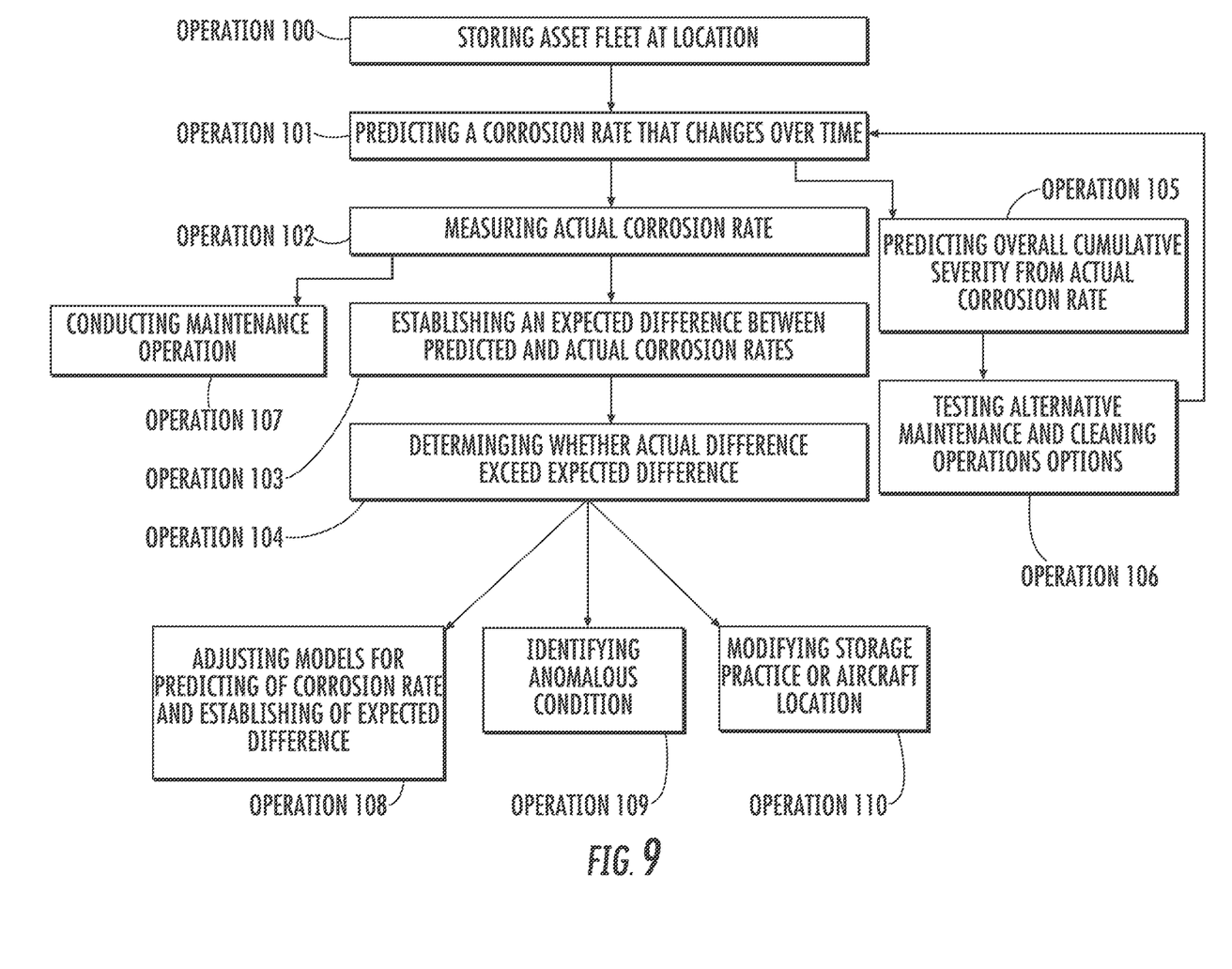
FIG. 9 is a flow diagram illustrating a corrosion management method for use with the asset fleet of FIG. 2.

With reference to FIG. 9, controllers 50 are disposed and configured to execute or facilitate execution of a corrosion management method. As shown in FIG. 9, the method includes storing an asset fleet at a location (operation 100), predicting a corrosion rate that changes over time for a material of a component of an asset of the asset fleet corresponding to the location (operation 101), measuring an actual corrosion rate of the material at the location (operation 102) using the corrosion sensors 4 of each of the assets 2, establishing an expected difference between the predicted corrosion rate and the actual corrosion rate in accordance with corrosion predicted contaminant load on the material, micro-environmental events and cleaning events (operation 103) and determining whether an actual difference between the predicted corrosion rate and the actual corrosion rate exceeds the expected difference (operation 104).

In accordance with embodiments, the predicting of the corrosion rate of operation 101 includes measuring an instant relative humidity at the first and second locations 200 and 210 over a period of time, measuring an instant temperature at the first and second locations 200 and 210 over the period of time and calculating from the instant relative humidity and the instant temperature an effective relative humidity (RH) at the location over the period of time. The predicting of the corrosion rate of operation 101 may further include associating the effective relative humidity with a contaminant load as determined by the corrosion sensors 4 for each of the assets 2 at the first and second locations 200 and 210 over the period of time.

In accordance with further embodiments, once the predicting of the corrosion rate of operation 101 is complete, the method may further include predicting an overall cumulative severity from the actual corrosion rate by integrating over time (operation 105) and then testing alternative maintenance and operations options (e.g., cleaning or maintenance to reset contaminant load using the cleaning and maintenance systems 40, 41 or sheltering the assets 2 in the indoor facilities 30) if the overall cumulative severity is judged to be excessive (operation 106). Once the testing is complete, control can return to operation 101.

In accordance with additional further embodiments, the method may include conducting a maintenance operation on the assets 2 (operation 107) in accordance with a result of the measuring of the actual corrosion rate of operation 102. Also, in an event that it is determined that the actual difference between the predicted corrosion rate and the actual corrosion rate exceeds the expected difference in operation 104, the method may further include at least one of: Adjusting models for the predicting of the corrosion rate and the establishing of the expected difference (operation 108); identifying that an anomalous condition is in effect or if there is a "hot spot" of environmental corrosion drivers such as excess contamination or moisture present that is not measured by RH sensors due to asset 2 usage (operation 109); and modifying a location (e.g. changing airport) or storage practice of the asset (operation 110).

While the embodiments have been described in detail in connection with only a limited number of embodiments, it should be readily understood that the embodiments are not so limited. Rather, the embodiments can be modified to incorporate any number of variations, alterations, substitutions or equivalent arrangements not heretofore described, but which are commensurate with the spirit and scope of the description. Additionally, while various embodiments have been described, it is to be understood that aspects may include only some of the described embodiments. Accordingly, the embodiments are not to be seen as limited by the foregoing description.

What is claimed is:

1. A corrosion management method, comprising:
   storing an asset fleet at a location;
   generating, in a controller, a corrosion rate stressor by reference to models for any component of an asset of the asset fleet corresponding to the location and storage practice of the asset;
   predicting, in the controller, an accumulated corrosion stressor severity from the generated corrosion rate stressor;
   measuring, with a corrosion sensor, an actual corrosion rate at the location; and
   revising, in the controller, the models in accordance with a difference between the predicted accumulated corrosion stressor severity and the measured actual corrosion rate.

2. The corrosion management method according to claim 1, wherein the generating of the corrosion rate stressor comprises:
   measuring an instant relative humidity at the location over a period of time;
   measuring an instant temperature at the location over the period of time; and
   calculating, in the controller, from the measured instant relative humidity and the measured instant temperature an effective relative humidity at the location over the period of time.

3. The corrosion management method according to claim 2, wherein the generating of the corrosion rate stressor further comprises associating the effective relative humidity with a contaminant load at the location over the period of time.

4. The corrosion management method according to claim 1, wherein the predicting comprises integrating the corrosion rate stressor over time.

5. The corrosion management method according to claim 4, further comprising testing maintenance and operations options.

6. The corrosion management method according to claim 1, further comprising conducting a maintenance operation on the asset in accordance with a result of the measuring of the actual corrosion rate.

7. A system for managing corrosion of an asset fleet, the system comprising:
   a plurality of assets disposed at a location;
   one or more corrosion sensors installed on each of the assets; and
   a controller coupled to the one or more corrosion sensors of each of the assets, the controller comprising a processing unit and a non-transitory computer readable medium having instructions stored thereon, which, when executed, cause the processing unit to:
   generate a corrosion rate stressor by reference to models for the location of any component of an asset of the asset fleet corresponding to the location and a storage practice of the asset,
   predict an accumulated corrosion stressor severity from the generated corrosion rate stressor,
   measure an actual corrosion rate stressor at the location, and
   revise the models in accordance with a difference between the predicted accumulated corrosion stressor severity and the measured actual corrosion rate stressor.

8. The system according to claim 7, wherein the generating of the corrosion rate stressor comprises:
   measuring an instant relative humidity at the location over a period of time;
   measuring an instant temperature at the location over the period of time; and
   calculating from the measured instant relative humidity and the measured instant temperature an effective relative humidity at the location over the period of time.

9. The system according to claim 8, wherein the generating of the corrosion rate stressor further comprises associating the effective relative humidity with a contaminant load at the location over the period of time.

10. The system according to claim 7, wherein the measuring of the actual corrosion rate comprises installing a corrosion sensor on the material.

11. The system according to claim 7, wherein the predicting comprises integrating the corrosion rate stressor over time.

12. The system according to claim 11, further comprising testing maintenance and operations options.

13. The system according to claim 7, further comprising conducting or scheduling maintenance, optimizing cleaning, asset location or storage operations on the asset in accordance with a result of the measuring of the actual corrosion stressor, or scheduling operations based on using the predictions from the system.

* * * * *